US 6,577,598 B1

(12) United States Patent
Hwang et al.

(10) Patent No.: US 6,577,598 B1
(45) Date of Patent: Jun. 10, 2003

(54) METHODS AND APPARATUS FOR CHANNEL ADAPTATION IN A DMT BASED SYSTEM

(75) Inventors: Chien-Meen Hwang, San Jose, CA (US); Hungming Chang, Cupertino, CA (US); Eugen Gershon, San Jose, CA (US); Muoi Huynh, San Jose, CA (US); Maged F. Barsoum, Sunnyvale, CA (US)

(73) Assignee: Legerity, Houston, TX (US)

( * ) Notice: Subject to any disclaimer, the term of this patent is extended or adjusted under 35 U.S.C. 154(b) by 0 days.

(21) Appl. No.: 09/286,996

(22) Filed: Apr. 7, 1999

(51) Int. Cl.[7] .................................................. H04J 15/00
(52) U.S. Cl. ........................ 370/235; 370/254; 370/480
(58) Field of Search ................................. 370/451, 230, 370/235, 468, 480, 254, 266, 358; 375/222, 254

(56) References Cited

U.S. PATENT DOCUMENTS

| | | | |
|---|---|---|---|
| 5,774,450 A | * 6/1998 | Harada et al. | 370/206 |
| 6,088,387 A | * 7/2000 | Gelblum et al. | 375/222 |
| 6,134,274 A | * 10/2000 | Sankaranarayanan et al. | 375/254 |
| 6,144,696 A | * 11/2000 | Shively et al. | 370/358 |

\* cited by examiner

Primary Examiner—Salvatore Cangialosi
(74) Attorney, Agent, or Firm—McDermott, Will & Emery

(57) ABSTRACT

A random-access local network having multiple nodes provides data communication across residential wiring such as telephone line as a network medium, where each node accesses the network medium using discrete multi-tone (DMT) modulated symbols. The effects of amplitude and phase distortion of transmitted DMT symbols are overcome, without the necessity of complex equalizers, by differentially encoding data prior to transmission, and recovering the transmitted data by comparing phase differentials between consecutive symbol tones. Each transmitted symbol is composed of a plurality of tone signals, each tone signal modulated according to a constellation point in a complex domain. A transmitter in a first node transmits a training symbol onto a network medium, where the DMT tones of the training symbol have an equal predetermined amount of energy. A second node, having received the training symbol from the network medium, transmits the received symbol as a retransmitted training symbol back onto the network medium. The first node receives the retransmitted training symbol and checks the energy level of each DMT tone of the retransmitted training symbol. Hence, the first node can identify certain DMT tones of the retransmitted training symbol as highly attenuated if the respective energy levels fall below a prescribed threshold. The first node then selects the DMT tones for transmission by avoiding the certain DMT tones that are highly attenuated.

13 Claims, 3 Drawing Sheets

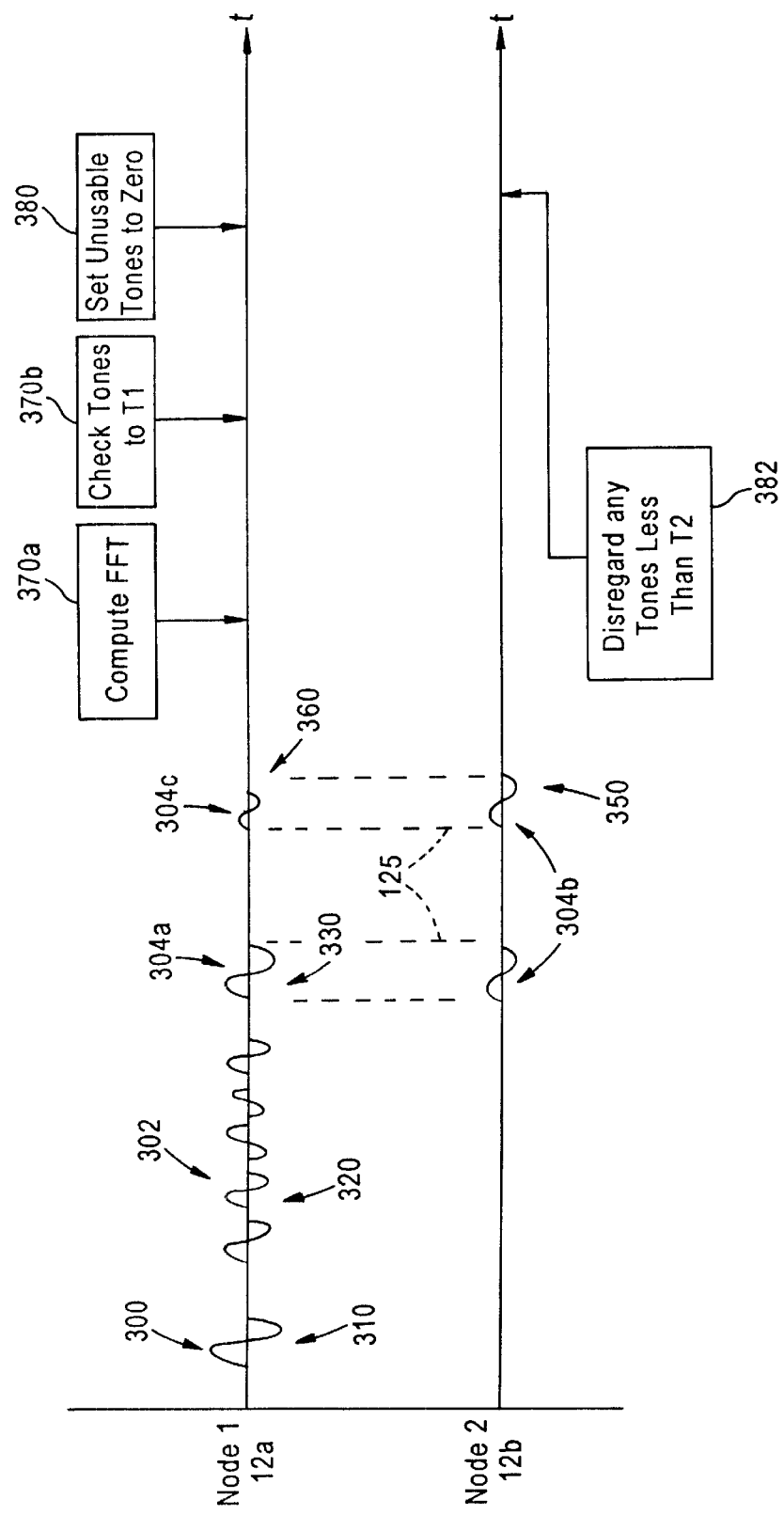

METHODS AND APPARATUS FOR CHANNEL ADAPTATION IN A DMT BASED SYSTEM

BACKGROUND OF THE INVENTION

1. Field of the Invention

The present invention relates to a transmission of data in a discrete multi-tone (DMT) data communications network, particularly a transmission and reception of data in a network for communications between multiple devices coupled to existing wiring, for example twisted pair telephone wiring in the user's residence.

2. Description of the Related Art

Modern society continues to create exponentially increasing demands for digital information and the communication of such information between data devices. Local area networks use a network, cable or other media to link stations on the network for exchange of information in the form of packets of digital data. A typical local area network architecture uses a media access control (MAC) enabling network interface cards at each station to share access to the media. Most conventional local area network architectures use media access controllers operating according to half-duplex or full-duplex Ethernet (ANSI/IEEE standard 802.3) protocol using a prescribed network medium, such as twisted pair cable.

These architectures have proven quite successful in providing data communications in commercial applications. However, these common local area network architectures require installation of specialized wiring and use of specific wiring topologies. For example, the most popular network protocols, such as Ethernet, require special rules for the wiring, for example with regard to quality of wire, range of transmission and termination.

Due to the success of the Internet and the rapid decreases in the prices of personal computers and associated data equipment, a demand has arisen for data communications between a limited number of devices within relatively small premises, typically a residence or small business. While existing local area networks can serve the purpose, in such installations, the cost of installing physical network wiring satisfying the rules for the particular protocol can be prohibitively expensive.

Most existing buildings, including residences, include some existing wiring, for phones, electrical power and the like. Proposals have been made to communicate data using such existing infrastructure. This reduces the costs of wiring for the network, but the existing wiring raises a variety of issues regarding transport of high-speed digital signals.

For example, efforts are underway to develop an architecture that enables computers to be linked together using conventional twisted pair telephone lines. Such an arrangement, referred to herein as a home network environment, provides the advantage that existing telephone wiring in a home may be used to implement a home network environment without incurring costs for substantial new wiring installation. However, any such network must deal with issues relating to the specific nature of in-home telephone wiring, such as operation over a media shared with other services without interference from or interfering with the other services, irregular topology, and noise. With respect to the noise issue, every device on the telephone line may be a thermal noise source, and the wiring may act much like an antenna to pick up disruptive radio signal noise.

Telephone lines are inherently noisy due to spurious noise caused by electrical devices in the home, for example dimmer switches, transformers of home appliances, etc. In addition, the twisted pair telephone lines suffer from turn-on transients due to on-hook and off-hook and noise pulses from the standard telephones coupled to the lines, and electrical systems such as heating and air conditioning systems, etc.

An additional problem in telephone wiring networks is that the signal condition (i.e., shape) of a transmitted waveform depends largely on the wiring topology. Numerous branch connections in the twisted pair telephone line medium, as well as the different associated lengths of the branch connections, may cause multiple signal reflections on a transmitted network signal. Telephone wiring topology may cause the network signal from one network station to have a peak-to-peak voltage on the order of 10 to 20 millivolts, whereas network signals from another network station may have a value on the order of one to two volts. Hence, the amplitude and shape of a received pulse may be so distorted that recovery of a transmit clock or transmit data from the received pulse becomes substantially difficult.

At the same time a number of XDSL technologies are being developed and are in early stages of deployment, for providing substantially higher rates of data communication over twisted pair telephone wiring of the telephone network. XDSL here is used as a generic term for a group of higher-rate digital subscriber line communication schemes capable of utilizing twisted pair wiring from an office or other terminal node of a telephone network to the subscriber premises. Examples under various stages of development include ADSL (Asymmetrical Digital Subscriber Line), HDSL (High data rate Digital Subscriber Line) and VDSL (Very high data rate Digital Subscriber Line).

Consider ADSL as a representative example. For an ADSL-based service, the user's telephone network carrier installs one ADSL modem unit at the network end of the user's existing twisted-pair copper telephone wiring. Typically, this modem is installed in the serving central office or in the remote terminal of a digital loop carrier system. The user obtains a compatible ADSL modem and connects that modem to the customer premises end of the telephone wiring. The user's computer connects to the modem. The central office modem is sometimes referred to as an ADSL Terminal Unit—Central Office or 'ATU-C'. The customer premises modem is sometimes referred to as an ADSL Terminal Unit—Remote or 'ATU-R'. The ADSL user's normal telephone equipment also connects to the line through a frequency combiner/splitter, which is incorporated in the ATU-R. The normal telephone signals are split off at both ends of the line and processed in the normal manner.

For digital data communication purposes, the ATU-C and ATU-R modem units create at least two logical channels in the frequency spectrum above that used for the normal telephone traffic. One of these channels is a medium speed duplex channel; the other is a high-speed downstream only channel. Two techniques are under development for dividing the usable bandwidth of the telephone line to provide these channels. One approach uses Echo Cancellation. Currently, the most common approach is to divide the usable bandwidth of a twisted wire pair telephone line by frequency, that is to say by Frequency Division Multiplexing (FDM).

FDM uses one frequency band for upstream data and another frequency band for downstream data. The downstream path is then divided by time division multiplexing into one or more high-speed channels and one or more low speed channels. The upstream path also may be time-division multiplexed into corresponding low speed channels.

The FDM data transport for ADSL services utilizes discrete multi-tone (DMT) technology. A DMT signal is basically the sum of N independently QAM modulated signals, each carried over a distinct carrier frequency channel. The frequency separation between consecutive carriers is 4.3125 kHz with a total number of 256 carriers or tones (ANSI). An asymmetrical implementation of this 256 tone-carrier DMT coding scheme might use tones 32–255 to provide a downstream channel of approximately 1 MHz analog bandwidth. In such an implementation, tones 8–31 are used as carriers to provide an upstream channel of approximately 100 kHz analog bandwidth. Each tone is quadrature amplitude modulated (QAM) to carry up to 15 bits of data on each cycle of the tone waveform (symbol).

The existing DSL systems provide effective high-speed data communications over twisted pair wiring between customer premises and corresponding network-side units, for example located at a central office of the telephone network. The DSL modem units overcome many of the problems involved in data communication over twisted pair wiring. However, for a number of reasons, the existing DSL units are not suitable to providing local area network type communications within a customer's premises. For example, existing ADSL units are designed for point-to-point communication. That is to say, one ATU-R at the residence communicates with one ATU-C unit on the network end of the customer's line. There is no way to use the units for multi-point communications. Also, the existing ADSL modems tend to be quite complex, and therefore are too expensive for in-home communications between multiple data devices of one customer.

A need therefore still exists for techniques to adapt DMT type DSL communications for use over existing in-home wiring. The adaptations should enable multi-point communications. Also, many of the problems overcome by complex methodologies in ADSL communications need corresponding simpler, more cost effective solutions for in-home networking.

For example, decoding of DMT data signals requires accurate timing between the transmitter and the receiver. In existing ADSL communications, one of the tone frequency channels is used as a pilot tone channel. DMT demodulation and decoding for all other channels is based on recovery of timing information from the pilot tone. Hence, existing systems suffer the disadvantage of requiring a pilot tone channel dedicated to providing complex attenuation information for receiver equalizers in networked systems. Coordination of reception of all of the other channels to the timing from the one pilot tone channel is extremely complex. Moreover, the necessity of an equalizer in the receiver system results in a high-cost and high-complexity receiver system, especially since the equalizer may need to retune itself to different coefficient settings for communication with different network nodes.

In a multi-point, random access communication application, the equalization problem becomes particularly acute. Unlike the point-to-point implementations where communications are always on-going and enable virtually continuous synchronization between transmitter and receiver, the random access type devices only send when they have data to send. As a result, the receiver needs to either be able to identify the transmitting node and quickly adjust its equalizer coefficient settings accordingly on a per-packet basis, or the receiver must use multiple equalizers, each tuned for reception of data from a corresponding network node, to simultaneously equalize the received signal and then determine the optimally-tuned signal. In addition, use of a training sequence attached on each packet in a packet-switched network (e.g., Ethernet) is impractical due to the necessity of a quick, adaptive equalizer scheme. Also, a transmitter clock frequency may be slightly different than a receiver clock frequency; hence, the transmitted constellation points may encounter phase rotation at the receiver end, requiring either synchronization between the transmitter and receiver, else the receiver needs to update its equalizer frequently to compensate for the rotation.

Hence, the equalization problem in a multi-point, random access communication application results in a substantially complex receiver system having sophisticated (and hence expensive) equalizers.

Implementation of a networked computer system using residential-type wiring, for example a DMT type communications network configured for use over existing in-home wiring, also suffers from the disadvantage that certain tones may be highly attenuated due to deep notches (i.e., attenuation points) in the channel frequency response. These notches may occur, for example, in home telephone wiring due to unterminated or poorly terminated stubs. Since the receiver would be unable to recover any data transmitted at the tones corresponding to the notches in the channel frequency response, use of those tones to transmit data would cause a high packet error rate.

A need therefore exists for a simpler form of transmitting and recovering data, particularly one that is readily adaptable to a multi-point network using existing wiring such as twisted pair telephone wiring on a user's premises.

SUMMARY OF THE INVENTION

The present invention overcomes the noted problems involved in data networking and satisfies the above stated needs by providing an arrangement at the physical layer, for use in a multi-point DMT communication system, that selects DMT tones for transmission of data based on detected attenuation characteristics in a training symbol. In particular, a first node transmits a training symbol onto a network medium, where the DMT tones of the training symbol have an equal predetermined amount of energy. A second node, having received the training symbol from the network medium, transmits the received symbol as a retransmitted training symbol back onto the network medium. The first node receives the retransmitted training symbol and checks the energy level of each DMT tone of the retransmitted training symbol. Hence, the first node can identify certain DMT tones of the retransmitted training symbol as highly attenuated if the respective energy levels fall below a prescribed threshold. The first node then selects the DMT tones for transmission by avoiding the certain DMT tones that are highly attenuated.

Additional advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

Reference is made to the attached drawings, where elements having the same reference numerals represent like elements throughout and wherein:

FIG. 3 is a diagram illustrating the method of channel adaptation based on detected DMT tone attenuation according to an embodiment of the present invention.

BEST MODE FOR CARRYING OUT THE INVENTION

Figure 1:
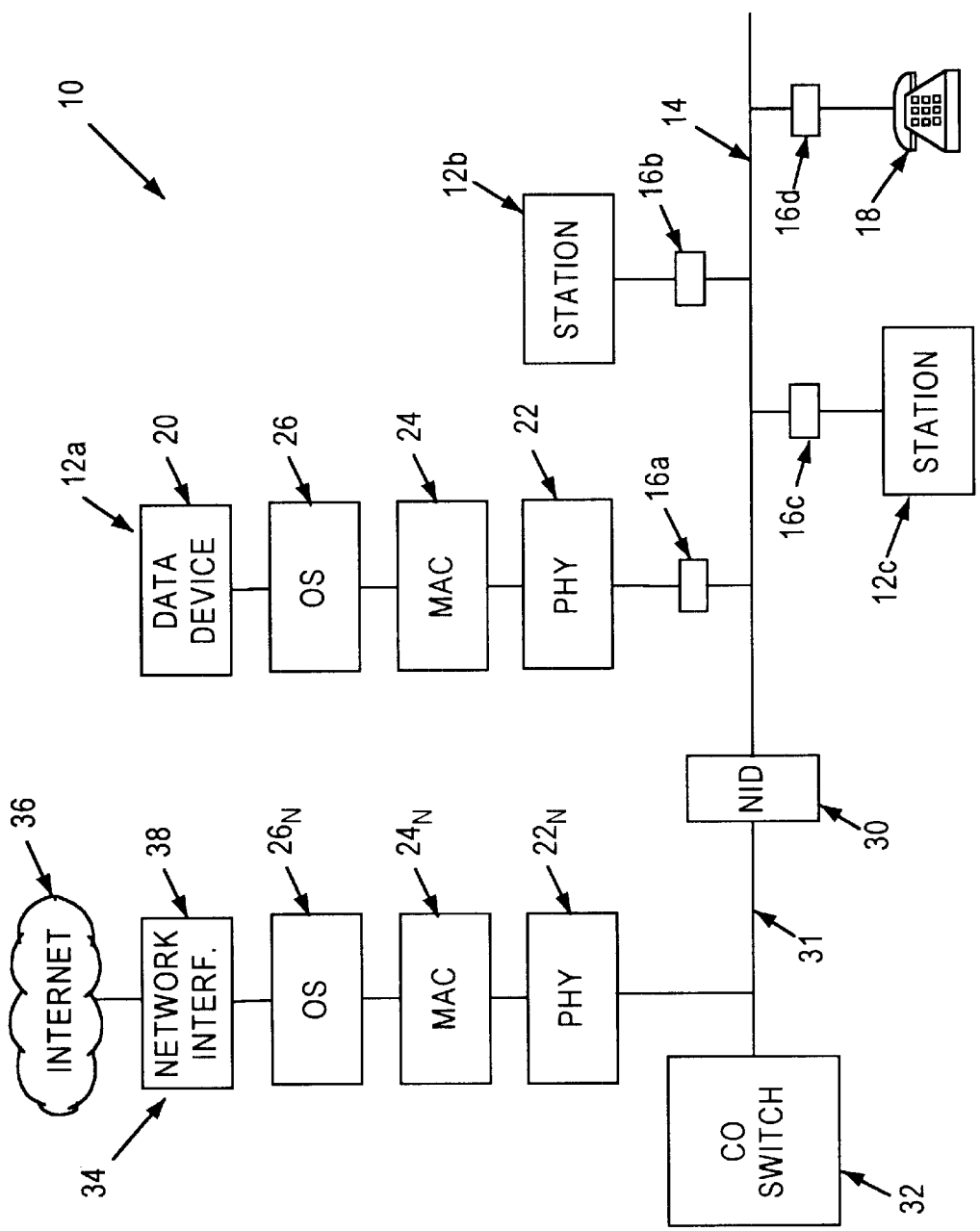
FIG. 1 is a block diagram illustrating a local area network deployed over residential twisted pair wiring.

FIG. 1 is a diagram of a local area network 10 implemented in a home or similar customer premises environment using network media 14 according to an embodiment of the present invention. The network may use a variety of different physical lines for the network media 14, such as coaxial cable, multi-pair cables, power lines, optical fiber or RF wireless communication links. In the preferred embodiment, the media 14 comprises twisted pair telephone wiring, commonly available in the home or office. As shown in FIG. 1, the network 10 includes network stations 12a, 12b and 12c that are connected to a telephone line (twisted pair) wiring 14, via RJ-11 phone jacks 16a, 16b and 16c respectively. A telephone 18 connected to the RJ-11 phone jack 16d may continue to make phone calls while one or more of the stations 12 are communicating data.

As illustrated in more detail with respect to exemplary first station 12a in FIG. 1, each home network station 12 comprises a data device 20, for example a personal computer, printer, or intelligent consumer electronics device. Each station 12 also includes a physical layer (PHY) transceiver 22, a media access (MAC) layer 24, and an operating system (OS) layer 26 that performs higher layer functions according to the OSI reference model. In the inventive network, the PHY transceiver utilizes digital signal processing techniques to implement discrete multi-tone transport of digital data over the telephone wiring 14.

The stations 12 communicate by transmitting network data modulated into the analog network signals in accord with the invention. In particular, the physical layer transmitter transmits data as discrete multi-tone (DMT) symbols carrying the actual digital communication data. The physical layer receiver receives and processes these signals and demodulates the DMT symbols to recover the data, described in further detail below.

The network 10 is envisioned as a home network, although it will be apparent that the network may be used in a variety of other customer locations. In many such installations, the network 10 will provide random access to the local area network media 14 for data communications between the stations 12 within the customer premises. However, it is within the scope of the invention to utilize the DMT-based data communications to access external networks. Normally, the customer premises wiring 14 connects through a network interface device (NID) 30 to a subscriber's telephone line 31. The line 31, in turn connects to a central office (CO) switch 32 of the public switched telephone network. The switch 32 provides normal voice-grade telephone services, for example for communications using the telephone 18.

However, the line 31 may also transport DMT signals at appropriate frequencies for access to another network. In such an installation, the telephone network operator or another service provider would have a digital terminal unit 34 coupled to the subscriber's telephone line 31. The device 34 provides access to an external wide area data network, for example using ATM or SMDS to gain access to the public packet switched data network 36 commonly referred to as the Internet. The digital terminal unit 34 includes a physical layer (PHY) transceiver $22_N$, a media access (MAC) layer $24_N$, and an operating system (OS) layer $26_N$ that perform functions similar to the transceiver 22, the MAC 24 and the OS 26 in each of the home stations 12, respectively. In the terminal 34, however, the data device takes the form of a network interface 38 for providing the appropriate interface to the physical transport media of the higher level data network 36.

The DMT transmitters and receivers in the DMT PHY transceivers 22 utilize digital signal processors, to generate and/or demodulate complex analog waveforms carrying bits of data modulated onto individual tones within the available bandwidth. For example, the transmitter generates a DMT symbol by supplying a number of samples through a digital to analog converter to produce the analog waveform of the symbol, having the mathematical properties necessary to represent the data carried by the symbol. Similarly, the receiver samples a received waveform and processes the time-domain values of the samples. This processing derives frequency-domain data, enabling the receiver to then detect the data bits transported on each tone contained within the symbol.

It should be noted that all PHY transceivers 22 of all stations 12, 34 on the line receive all transmissions relating to data communications made over the line 14, 31. The ID and control waveform is used to physically assert control over the random access media. All receivers demodulate the packet data within the DMT signals. Packet addresses, corresponding to the sending and receiving stations 12 or 34 for a given communication reside within the packet data.

Figure 2:
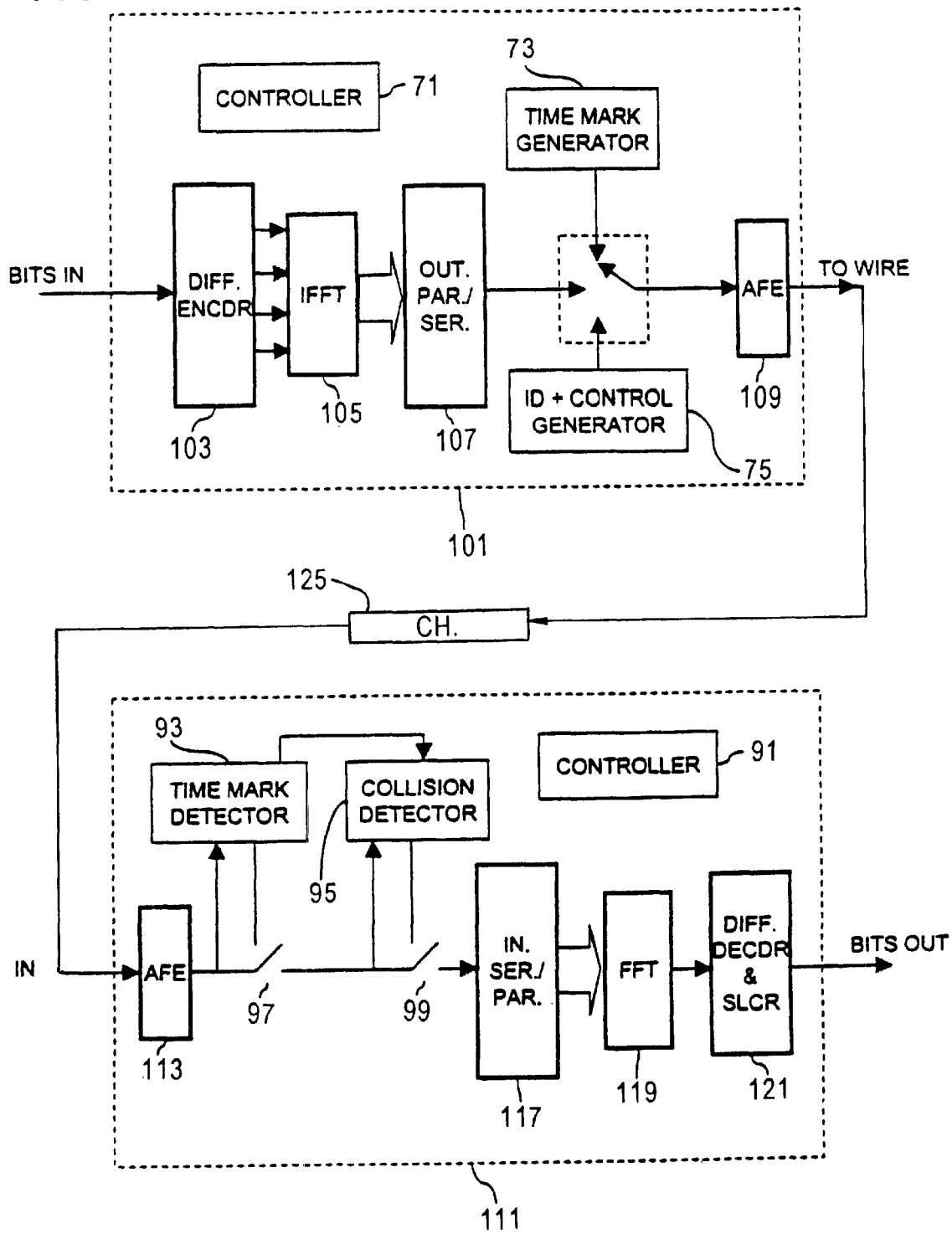
FIG. 2 is a block diagram illustrating a DMT transmitter and receiver for sending and receiving DMT signals as training symbols according to an embodiment of the present invention.

FIG. 2 provides a simplified block diagram of the functional elements of a DMT transmitter and DMT receiver for use in the PHY transceivers 22 of the network 10 (FIG. 1).

The transmitter 101 receives a digital bit stream from a digital source, for example a host central processing unit (CPU) (not shown). The bit stream enters the differential encoder 103, which maps a prescribed number of bits of the bit stream (e.g., 2) to points on the complex plane (i.e., constellation points), in similar fashion to the operating principles of QPSK (quadrature phase shift keying). However, unlike QPSK, the differential encoder 103 encodes the difference between a current constellation point with a previous constellation point. That is, the phase difference between constellation points defines the encoding of the bits.

The use of differential coding, which encodes the information on the amplitude and phase difference between transmitted constellation points, enables the decoding of the transmitted information by a differential decoder 121 without knowledge of the media channel characteristics (e.g., attenuation and phase distortion). In addition, the differential encoding of the information on consecutive symbols effectively updates the constellation rotation, reducing the impact caused by differences in the transmitter clock and the receiver clock. As such, this technique eliminates the need for a frequency domain equalizer (FEQ) to compensate for amplitude and phase distortion caused by the channel 125.

The output of the differential encoder 103 is a parallel array of "complex numbers." These complex numbers are input in a parallel manner into an Inverse Fast Fourier Transform (IFFT) logic 105. The IFFT logic 105 converts the complex numbers into time-domain waveforms, which are then supplied to an output parallel-to-serial logic 107. The output parallel-to-serial logic 107 basically arranges the time-domain waveforms into a serial stream of waveforms. A guard band or cyclic-prefix can be prepended to this serial stream before entering the analog front end (AFE) circuit 109 to minimize intersymbol interference (ISI). ISI is an overlapping of waveforms that distorts all symbols involved, potentially corrupting all of them. Among other functions, the AFE circuit 109 performs digital to analog (D/A) conversion and sends the symbol, which includes the differentially encoded signals, over channel 125 to receiver 111.

As mentioned previously, the noise within the in-home wiring is quite pronounced. Because of the reflections caused by improper terminations, deep nulls are formed at certain frequencies on the home network. As the symbol propagates through the channel 125, the symbol is attenuated when it arrives at the receiver 111. The receiver 111 of FIG. 2, nonetheless, enables recovery of the transmitted symbol. The receiver 111 receives the symbol using the AFE circuit 113, which is responsible for filtering the analog waveform of the symbol and converting it to a digital equivalent. After processing of the received signal by the AFE 113, the digitized or discrete waveforms are input to an input serial-to-parallel logic 117 for conversion to a parallel array of waveforms. A Fast Fourier Transform logic 119 converts these waveforms back to complex numbers, which are then mapped by the differential decoder and slicer 121 to corresponding bit sequences to recover the original data bits. The bits of data derived from all of the channels of one symbol are combined then into a serial bit stream and output by the receiver 111.

For ease of discussion, the foregoing description assumes differential quadrature phase-shift keying type modulation (DQPSK). Because of the relatively short distances involved in communication over in-home wiring, typically all 256 tones provide adequate transport for the DQPSK modulated signals. As described below, however, the number of tones utilized in a particular installation or even during a particular communication session may need to be changed. For example, there may be installations were certain tones are unusable, due to noise or poor line characteristics. In another installation, all tones may be usable, but some can carry differential QAM modulation for various numbers of bits up to 15 bits, but other tones provide only adequate transport for the 2-bit DQPSK.

According to the present invention, DMT tones are selected for transmission of data based on the detected response characteristics of a transmitted training symbol.

FIG. 3 is a diagram illustrating the method of identifying DMT tones capable of transmitting data based on detected attenuation characteristics according to an embodiment of the present invention. The method begins by the transmitter 101 of a given node (e.g., node 12a), transmitting a time mark 300 in step 310 and an ID symbol 302 in step 320. Each transmission begins with a timing mark 300. The timing mark 300 is used by the transmitter 101 to determine the status of the line to determine if the line is free. The timing mark 300 is also used by the receiver 111 for decoding of subsequently-received symbols. The transmitter 101 then transmits a modulated identification signal 302, used to uniquely identify the transmitting station. Any transceiver receiving the ID signal 302 (including that of the sending station) determines if there has been a collision by recognizing that a signal following the timing mark has been corrupted by collision with a timing signal and/or identification signal from another transmitter.

Assuming no collision is encountered, the transmitting node 12a then transmits a training symbol 304a onto the network medium 14 carrying channel 125 in step 330. The training symbol is transmitted as a set of DMT tones, where all the DMT tones are transmitted at equal energy (i.e., the DMT tones have an equal predetermined amount of energy). A receiving node (e.g., node 12b), upon receiving the training symbol 304b from the network channel 125 on the network medium 14, stores the training symbol 304b and retransmits (i.e., reflects) the training symbol 304b in step 350. As recognized from the foregoing, the training symbol 304b transmitted by the receiving node 12b includes attenuation characteristics due to transmission on the channel 125 of the training symbol 304a from the first node 12a to the second node 12b. Depending on the properties of the channel 125, certain DMT tones may be substantially attenuated.

The transmitting node 12a then receives in step 360 the training symbol 304c that includes the attenuation characteristics due to transmission of symbol 304b from node 12b to node 12a. The transmitting node 12a can then analyze the training symbol 304c in step 370, for example by computing the FFT of the symbol 304c in step 370a, and checking the energy level of each DMT tone of the symbol 304c in step 370b to a corresponding prescribed threshold. If the transmitting node 12a determines in step 370b that certain DMT tones are below their respective thresholds (illustrated, e.g., as T1), the controller 71 deems these tones as highly attenuated and unsuitable for transmission of data. Hence, the transmitting node 12a can select those DMT tones exceeding their threshold T1 as suitable for transmitting data, and avoid those attenuated DMT tones below their threshold T1, for optimal transmission of data across the media channel 125. Those DMT tones that are deemed as unusable have their respective output energy levels set to zero in step 380, followed by transmission of data symbols using the usable multiple tones.

Hence, the nodes 12a and 12b use a protocol where the receiving node 12b reflects the received training symbol 304b, enabling the transmitting node 12a to determine the attenuation characteristics of the channel 125.

The receiving node 12b can also determine which tones were used during data transmission by analyzing the energy of the transmitted tones. Any tone whose energy is less than some nominal threshold T2 (i.e., substantially less than T1), is deemed by the receiving node 12b in step 382 as not in use, such that the receiving node 12b does not attempt to extract any data bits from the sub T2 threshold DMT tones. Hence, the receiving node 12b can adjust any necessary receiver circuitry, for example logic in the FFT 119 or the differential decoder 121, based on the determination that certain DMT tones are not in use.

Certain variations in the above arrangement may be made. For example, the above-described training is typically done during the first time that the first node 12a is transmitting to the second node 12b, or if some time period has passed since the last training between nodes 12a and 12b took place. Node 12a will store in its memory the tones that should not be used when transmitting to node 12b. When transmitting to node 12b, node 12a will retrieve the unusable tones from memory in controller 71, and transmit on the remaining (usable) tones. Such an arrangement may cause an increase in memory if the transmitting node 12a needs to store the set of unusable tones for every other node on the network. In order to save memory space, each node 12 can be configured to store only the union (i.e., a superset) of all the unusable tone sets; in such a variation, a transmitting node 12 will not use any tones in the superset, regardless of the destination node.

Another variation is that a symbol may be used as both the ID symbol and as the training symbol by the transmitting node 12a in order to save one symbol time. In such a variation, the receiving node 12b will reflect back the ID symbol of the transmitting node 12a as the retransmitted symbol. Also, the training symbol 304a does not necessarily need to follow the timing signal 300.

Another variation is that the above-described training may be used between network nodes only as needed. In particular, the training can be skipped during initial transmissions if it is expected that all the DMT tones will be usable on the network most of the time. The receiving node 12b may generate a training symbol from the transmitting node 12a, for example if the receiving node 12b detects an excessive number of errors (e.g., CRC errors) following reception of a complete data packet from node 12a. In such a case, the receiving node 12b may send back the last received symbol as if it were a training symbol, enabling the transmitting node 12a to analyze the symbol for unusable tones.

The DMT transmitter and the DMT receiver may be implemented in a number of different ways. For example, they be implemented as specifically engineered chips having logic circuits and other components for performing the functions described above. Alternatively, one or both may be implemented using a general purpose digital signal processor and appropriate programming.

As discussed above, the DMT waveform includes a timing mark, an ID waveform, and a training symbol before transmission of the first data symbol of a data packet. Alternately the ID waveform may be used as the training symbol. To generate these signals, the transmitter 101 includes a time mark generator, a controller 71 and an ID and control signal generator 75. The interconections of the controller to the other elements of the transmitter 71 are omitted for simplicity of illustration. A clock (not shown) generates a signal defining the sampling clock rate, for example 2 MHz for the transmitter. The sampling clock drives the DAC function of the AFE 109 in the transmitter. The controller 71 controls a timed sample output selection function, represented diagrammatically as a switch, to selectively couple samples from the time mark generator 73, the ID and control generator outputting the ID and training sample, and the parallel/serial logic circuit 107 to the AFE 109. Corresponding receivers 93 and 95 are controlled by controller 91, diagrammatically illustrated as switches 97 and 99, for the reception of the timing signals, the ID signals, and the training symbol. The controllers 71 and 91 monitor the received training symbols and control the associated circuitry for selection of DMT tones to be used in transmitting data.

Those skilled in the art will recognize that the present invention admits of a number of modifications, within the spirit and scope of the inventive concepts.

While the foregoing has described what are considered to be preferred embodiments of the invention it is understood that various modifications may be made therein and that the invention may be implemented in various forms and embodiments, and that it may be applied in numerous applications, only some of which have been described herein. It is intended by the following claims to claim all such modifications and variations which fall within the true scope of the invention.

What is claimed is:

1. A method for configuring a first network node for transmission on a shared network medium in a random-access multipoint network, comprising:
    transmitting from the first network node onto the shared network medium a symbol as a plurality of discrete multiple tones each having a corresponding predetermined energy;
    receiving at a second network node the symbol, the received symbol having distortion encountered during transmission on the shared network medium;
    retransmitting the received symbol from the second network node onto the shared network medium; and
    detecting in the first network node whether at least one tone from the plurality of discrete multiple tones is attenuated based on reception of the retransmitted received symbol on the shared network medium, the first network node selecting usable ones of the discrete multiple tones for transmission of data symbols based on detecting whether at least one tone is attenuated.

2. A method as in claim 1, further comprising transmitting a data symbol at the selected usable tones.

3. A method as in claim 2, further comprising disregarding at the second network node any of the discrete multiple tones that fall below a prescribed minimum threshold.

4. A method as in claim 1, wherein the detecting step includes identifying any of the discrete multiple tones of the retransmitted received symbol that falls below a prescribed threshold as said at least one attenuated tone.

5. A method as in claim 1, wherein the transmitting step includes transmitting said symbol as an identification symbol of the first network node and contiguously following transmission of a timing signal by the first network node.

6. A method as in claim 1, wherein the transmitting step includes transmitting said symbol contiguously following after a timing signal and an identification symbol of the first network node.

7. A method as in claim 1, wherein the transmitting step includes transmitting the symbol as said plurality of discrete multiple tones each having the predetermined energy during initialization of the network.

8. A method as in claim 1, further comprising:
    transmitting from the first network node onto the shared network medium an initial symbol as a plurality of said discrete multiple tones each having a same corresponding energy;
    transmitting a training request from the second network node in response to detection of errors in the initial symbol on the shared network medium;
    wherein the transmitting step includes transmitting the symbol in response to said training request from the second network node.

9. The method of claim 1, further comprising storing in the first network node any attenuated tone as an unusable tone.

10. A random-access multipoint network, comprising:
    a residential wiring used as a shared network medium;
    a first node having a transceiver for transmitting onto the shared network medium a symbol as a plurality of discrete multiple tones each having a corresponding predetermined energy, and receiving transmitted network symbols; and
    a second node having a transceiver for receiving the symbol from the shared network medium, and for retransmitting the received symbol back onto the shared network medium;
    wherein the first node, in response to detecting whether at least one tone from the plurality of discrete multiple tones is attenuated during reception of the retransmitted received symbol on the shared netvork medium, selects usable ones of the discrete multiple tones for transmission of data symbols.

11. A network as in claim 10, wherein the first node includes a controller for storing any attenuated tone and for selecting the usable ones of the discrete multiple tones.

12. A network as in claim 10, wherein the first node outputs the symbol having the discrete multiple tones at the corresponding predetermined energy contiguously following a timing signal and an identification symbol.

13. A network as in claim 10, wherein the first node outputs the symbol having the discrete multiple tones at the corresponding predetermined energy as an identification symbol contiguously following a timing signal.

* * * * *